US012721275B2

(12) United States Patent
Lu et al.

(10) Patent No.: US 12,721,275 B2
(45) Date of Patent: Sep. 1, 2026

(54) FRUIT PERCEPTION SYSTEM FOR ROBOTIC HARVESTING

(71) Applicants: The United States of America, as represented by the Secretary of Agriculture, Washington, DC (US); MICHIGAN STATE UNIVERSITY, East Lansing, MI (US)

(72) Inventors: Renfu Lu, Okemos, MI (US); Zhaojian Li, Ann Arbor, MI (US); Kaixiang Zhang, Okemos, MI (US); Kyle Lammers, Grand Rapids, MI (US); Pengyu Chu, Lansing, MI (US)

(73) Assignees: The United States of America, as represented by the Secretary of Agriculture, Washington, DC (US); MICHIGAN STATE UNIVERSITY, East Lansing, MI (US)

( * ) Notice: Subject to any disclaimer, the term of this patent is extended or adjusted under 35 U.S.C. 154(b) by 361 days.

(21) Appl. No.: 18/463,516

(22) Filed: Sep. 8, 2023

(65) Prior Publication Data

US 2025/0081892 A1 Mar. 13, 2025

(51) Int. Cl.

*A01D 46/30* (2006.01)
*A01D 46/24* (2006.01)
*B25J 9/16* (2006.01)

(52) U.S. Cl.

CPC ............. *A01D 46/30* (2013.01); *A01D 46/24* (2013.01); *B25J 9/1697* (2013.01)

(58) Field of Classification Search

CPC ........ A01D 46/24; A01D 46/30; B25J 9/1697

(Continued)

(56) References Cited

U.S. PATENT DOCUMENTS

2023/0196599 A1 * 6/2023 Tao ........................ G06V 10/82 382/154
2026/0083061 A1 * 3/2026 Li .......................... A01D 46/24

FOREIGN PATENT DOCUMENTS

CN 115077419 A * 9/2022 ......... G01B 11/2433
CN 116097981 A * 5/2023 ............. A01D 46/30

(Continued)

OTHER PUBLICATIONS

Feng Qingchun, Cheng Wei, Zhou Jianjun, Wang Xiu. "Design of structured-light vision system for tomato harvesting robot" Int J Agric & Biol Eng. Volume 7. Issue 2. pp. 19-26. DOI: 10.3965/j.ijabe.20140702.003 (Year: 2014).*

(Continued)

*Primary Examiner* — Xiao Liu
*Assistant Examiner* — Eric James Shoemaker
(74) *Attorney, Agent, or Firm* — John Fado; Matthew Bussan

(57) ABSTRACT

The fruit perception system for a robotic harvester acquires and processes fruit detection and localization information to enable a robotic manipulator arm to connect with a targeted fruit. The system includes multiple embodiments, but comprises at least one RGB-D camera and one horizontally slidable line scan laser. The system uses the RGB-D camera data and a planning algorithm to identify a specific target fruit to pick first. The line scan laser paints the surface of the target fruit with a laser line and the RGB-D camera extracts line scan laser image data and communicates the line scan laser image data to a controller/processor. The controller/processor processes the extracted laser line image data and determines the xyz position of the centroid of the target fruit, so that the controller/processor directs a manipulator arm to pick the fruit.

20 Claims, 10 Drawing Sheets
(2 of 10 Drawing Sheet(s) Filed in Color)

(58) Field of Classification Search
USPC .......................................................... 382/110
See application file for complete search history.

(56) References Cited

FOREIGN PATENT DOCUMENTS

| | | | | | |
|---|---|---|---|---|---|
| ES | 2296452 | A1 * | 4/2008 | ............... | G01V 8/22 |
| WO | WO-2008037035 | A1 * | 4/2008 | ............ | A01D 46/30 |

OTHER PUBLICATIONS

Takeshi Yoshida, Yuki Onishi, Takuya Kawahara, Takanori Fukao. "Automated harvesting by a dual-arm fruit harvesting robot" Robomech Journal. vol. 9. Issue 19. (Year: 2022).*

Yeyin Shi, Ning Wang, Randal K. Taylor, William R. Raun, James A. Hardin. "Automatic com plant location and spacing measurement using laser line-scan technique" Precision Agriculture. vol. 14. pp. 478-494. (Year: 2013).*

Q. Feng, X. Wang, G. Wang and Z. Li, "Design and test of tomatoes harvesting robot," 2015 IEEE International Conference on Information and Automation, Lijiang, China, 2015, pp. 949-952, doi: 10.1109/ICInfA.2015.7279423. (Year: 2015).*

Yoshida, T., Kawahara, T. & Fukao, T. "Fruit recognition method for a harvesting robot with RGB-D cameras," Robomech J 9, 15 (2022). https://doi.org/10.1186/s40648-022-00230-y (Year: 2022).*

* cited by examiner

FRUIT PERCEPTION SYSTEM FOR ROBOTIC HARVESTING

FIELD OF THE INVENTION

The disclosed subject matter relates to harvesting apples with automated equipment. Specifically, the subject matter described herein relates to a robotic harvester perception system which systematically locates and selectively "picks" targeted fruits/apples using automated equipment.

BACKGROUND OF THE INVENTION

While mechanized harvesting technologies have been used to harvest field crops such as corn and wheat, the fruit sector (e.g., apples, citrus and pears) still relies on seasonal manual labor. However, the availability of human farm labor resources continues to steadily decline, and the cost of labor continues to increase. Tasks like manual harvesting involve extensive body motion repetitions and awkward postures (especially when picking fruits at high places or deep in the canopy, and repeatedly ascending and descending ladders with heavy loads), which put workers at risk for ergonomic injuries. In the fruit industry, robotic harvesting is a necessary and timely solution that can address these types of economic and workers' health concerns.

Research on robotic harvesting technologies has been ongoing for several decades, and different robotic systems have been proposed to address industry concerns. The current inventors' prior robotic harvesting-related disclosures include at least U.S. Pat. No. 9,919,345, and currently pending U.S. patent application Ser. No. 17/188,177, and 63/472,437, in cooperation with Michigan State University) which are hereby incorporated by reference.

Current state-of-the-art robotic harvesting systems consist of at least a perception module/system, a manipulator/manipulation arm, an end-effector, and a computer controller/processor. The perception module typically exploits onboard sensors (e.g., cameras and LiDARs) to detect and localize the fruit. Once the fruit position is determined by the perception system, the manipulator is controlled to reach the target fruit, and then a specialized end-effector (e.g., gripper or vacuum tube) is actuated to detach the fruit. The computer controller/processor controls and/or coordinates the movement or action of the individual components/subsystems of the robotic harvesting system, performs data/image acquisition and processing, and determines the sequence of fruit picking. Consequently, the development of a robotic harvesting system requires multi-disciplinary advancements to enable a variety of synergistic functionalities.

Among the various tasks, fruit detection and localization are the gateway technologies required to enable a robotic system to function. The fruit detection system's function is to identify/distinguish fruits from the complex background of the orchard environment. The localization process then calculates the spatial positions of the detected fruits—and preferably the centroid of the detected fruit. Due to variable lighting conditions, color variations (associated with the degree of fruit ripeness and varietal differences), and fruit occlusions by foliage, developing perception algorithms capable of fruit detection and localization poses significant technical challenges.

Fruit detection is currently accomplished using color images captured by RGB cameras. In general, these approaches can be classified into two categories: (1) feature-based, and (2) deep learning-based. The feature-based methods use differences among predefined features such as color, texture, and geometric shape to identify the fruit. Alternatively, various conventional computer image processing techniques (e.g., Hough transform-based circle detection method, optical flow method, and Otsu adaptive threshold segmentation) are used for feature extraction. Such methods perform well under certain simple harvesting scenarios but are susceptible to varying lighting conditions and heavy occlusions. This is because the extracted features are defined artificially, and they are not universally adaptable and may lack generalization capabilities in distinguishing target fruits when the harvesting scene changes. In contrast to feature-based methods, deep learning-based methods exploit convolutional neural networks to extract abstract features from color images, making them suitable for complex recognition problems.

Deep learning-based object recognition algorithms have seen tremendous success in recent years, and a variety of network structures, e.g., region convolution neural network (RCNN), You Only Look Once (YOLO), and Single Shot Detection (SSD), have been studied and extended for fruit detection. Specifically, RCNN-based approaches employ a two-stage network architecture, in which a region proposal network (RPN) is used to search the region of interest and a classification network is used to conduct bounding box regression. As opposed to two-stage networks, YOLO and SSD-based one-stage networks merge the RPN and classification branch into a single convolution network architecture, which enjoys improved computation efficiency.

Once the fruits are recognized, 3-dimensional (3D) localization must be conducted to compute the spatial coordinates of a target fruit. Accurate fruit localization is crucial since erroneous localization will cause the manipulator to miss the target and subsequently degrade the harvesting performance of the robotic system. Various sensor configurations and techniques have been used for fruit localization.

One current system/example is (passive) stereo vision, which exploits a two-camera layout and triangulation optical measurement principle to obtain depth information. For such systems, the relative geometric pose of the two cameras needs to be carefully designed and calibrated, and sophisticated algorithms are required to search common features in two dense RGB images for stereo matching. However, the generation of spatial depth information is computationally expensive, and the performance of stereo matching is inevitably affected by occluded pixels or varying lighting conditions that are common in the natural orchard environment.

Consumer RGB-D cameras are another type of depth measurement sensor that has been used to localize fruits. Different from passive stereo vision systems that purely rely on natural light, the RGB-D sensors include a separate artificial illumination source to aid the depth computation. Based on the methods used to determine depth measurements, RGB-D cameras can be divided into three categories: structured light (SL), time of flight (ToF), and active infrared stereo (AIRS).

An SL-based RGB-D sensor usually consists of a light source and a camera system. The light source projects a series of light patterns onto the workspace, and the depth information can then be extracted from the images based on the deformation of the light pattern. The first-generation Kinect (Microsoft Corp., Redmond, WA, USA) and the RealSense F200 and SR300 (Intel Corp., Santa Clara, CA, USA) are representative consumer sensors that operate with SL, and they have been utilized in agricultural applications.

The ToF-based RGB-D sensors use an infrared light emitter to emit light pulses onto the scene. The distance between the sensor and the object is calculated based on the known speed of light and the round trip time of the light signal. One important feature of the ToF systems is that their depth measurement precision does not deteriorate with distance, which makes them suitable for harvesting applications requiring a long perception range.

The AIRS-based RGB-D sensors are an extension of the conventional passive stereo vision system. They combine an infrared stereo camera paired with an active infrared light source to improve the depth measurement in low-texture environments. One of the most widely used AIRS sensors in fruit localization is the RealSense D400 family (Intel Corp., Santa Clara, CA, USA).

Despite some successes, the sensors discussed supra may have limited and unstable performance in the natural orchard environment. For example, the SL-based sensors are sensitive to the natural light condition and to the interference of multiple patterned light sources. The ToF systems are vulnerable to scattered light and multi-path interference, and usually provide lower resolution of depth images compared to other RGB-D cameras. Similar to passive stereo vision systems, the AIRS-based sensors encounter stereo matching issues, which can lead to flying pixels or over-smoothing around the contour edges. In addition, the performance of these sensors can deteriorate significantly when target fruits are occluded by leaves and branches, due to low or limited density of the illuminating light patterns or point cloud. Additionally, as noted supra, both stereo vision systems and RGB-D sensors have inherent depth measurement limitations associated with providing precise fruit localization information that is necessary for effective robotic harvesting systems.

The need exists for an effective fruit perception system/module capable of fruit localization to efficiently direct a robotic fruit picking mechanism. The perception module disclosed herein comprises an "Active LAser-Camera Scanner (ALACS)" depth perception system, which improves fruit detection and localization based on the laser-triangulation principle. The ALACS system comprises a red active line laser, an RGB camera, and a linear motion slide, coupled with an active scanning scheme to perform fruit localization.

Specifically, the current invention comprises at least three primary embodiments. In the first preferred embodiment, an RGB camera is paired with an active red line laser and an RGB-D camera. The second preferred embodiment comprises an RGB-D camera paired with the active line laser without the RGB camera. The third embodiment comprises two active line lasers in combination with an RGB-D camera with AIRS capability. The configuration for the third embodiment is intended to be used with two manipulation arms. The second embodiment is the most preferred of the three preferred embodiments. In all embodiments, RGB-D camera and (if applicable) the RGB camera have infrared capabilities.

SUMMARY OF THE INVENTION

This disclosure is directed to a robotic harvester perception system for picking fruit. The system comprises a line scan laser mounted on a horizontally adjustable slide mechanism. The line scan laser is positioned so that a laser line projected from the line scan laser is within the field of view of an RGB-D camera. The system also comprises a controller/processor in communication with the slide mechanism, the line scan laser, and the RGB-D camera. The controller/processor directs the movements of the line scan laser and processes images from the RGB-D camera.

The perception system is structured so that the slide mechanism moves the scan line laser, and the line scan laser projects a laser line onto a target fruit from multiple sequentially attained positions. Simultaneously the RGB-D camera acquires images of the laser line projected onto the target fruit, and communicates the laser line images to the controller/processor. The controller/processor processes the laser line images and determines the xyz position of the centroid of the target fruit.

BRIEF DESCRIPTION OF THE DRAWINGS

The patent or application file associated with this disclosure contains at least one drawing executed in color. Copies of this patent or patent application publication with color drawing(s) will be provided by the Office upon request and payment of the necessary fee.

In accordance with the first preferred embodiment, a controller/processor first determines the initial fruit detection information for a target fruit based on images acquired by the RGB-D camera. The line scan laser then scans the target fruit. The RGB camera acquires color images of the laser line as it paints the target fruit and communicates the images to the controller/processor. The controller/processor uses the images and a laser triangulation technique to localize the fruit and to determine the xyz position of the centroid of the target fruit.

Figure 2:
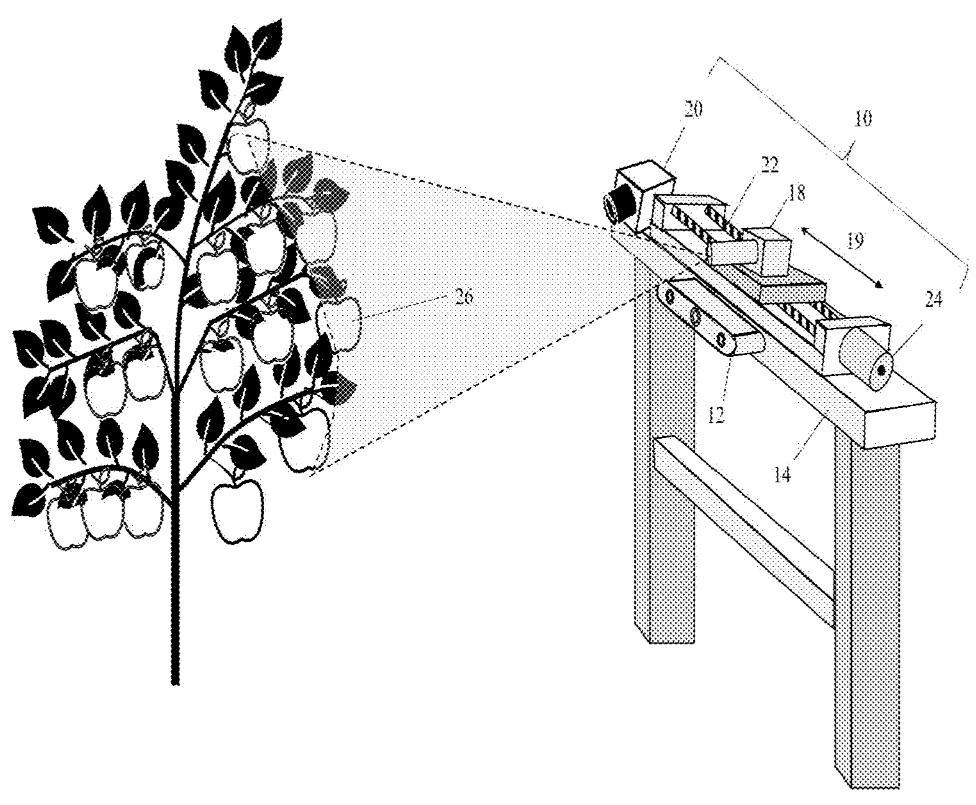
FIG. 2 is an elevated perspective front view of the first preferred embodiment of the ALACS robotic harvesting system. The first preferred embodiment includes both an RGB camera and an RGB-D camera, as well as a line scan laser.
Figure 3:
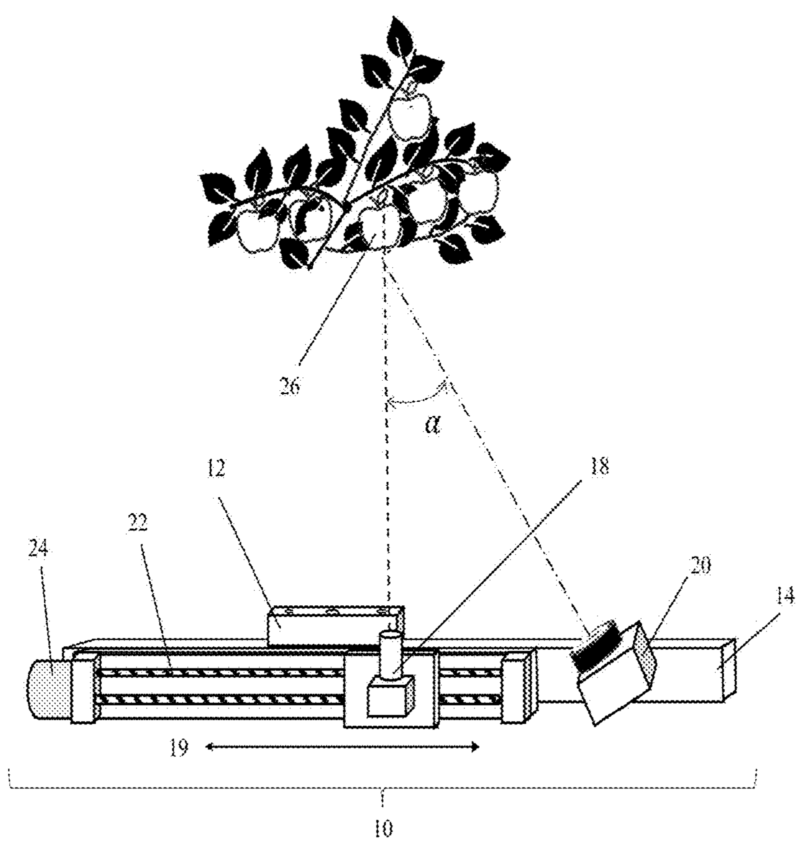

FIG. 3 is a top view of the ALACS system, shown in FIG. 2. The RGB camera is positioned with an angle of a relative to the axis of the line laser.

Figure 4:
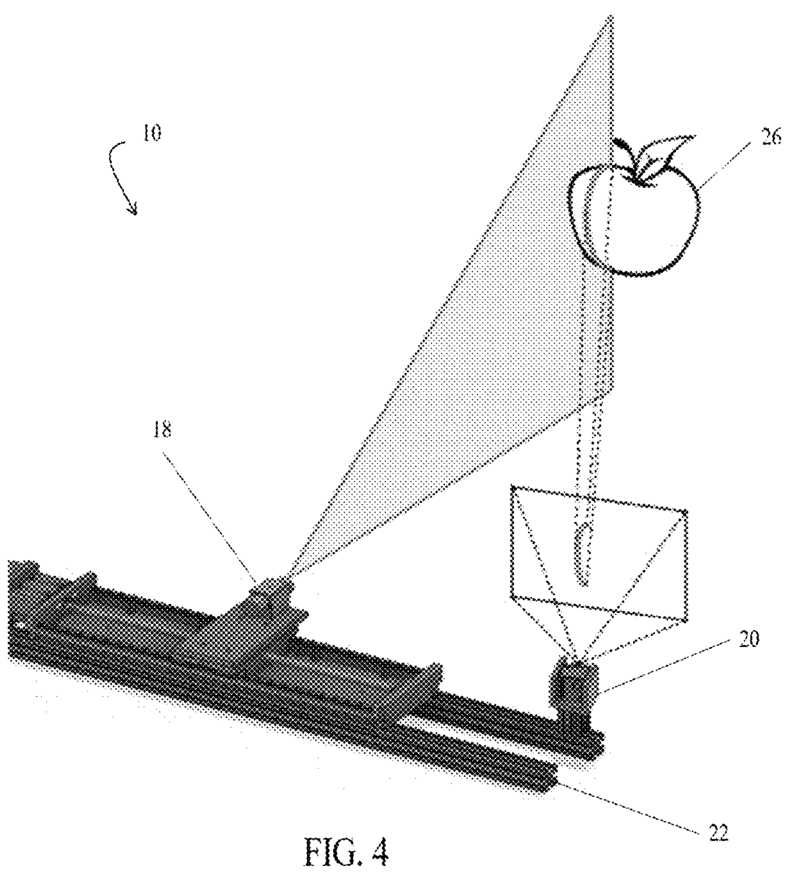

FIG. 4 is a perspective view showing the basic working principle of the ALACS system. Specifically, FIG. 4 shows that the line laser projects a laser line onto the target fruit and then uses the image information and triangulation technique to localize the fruit.

Figure 5:
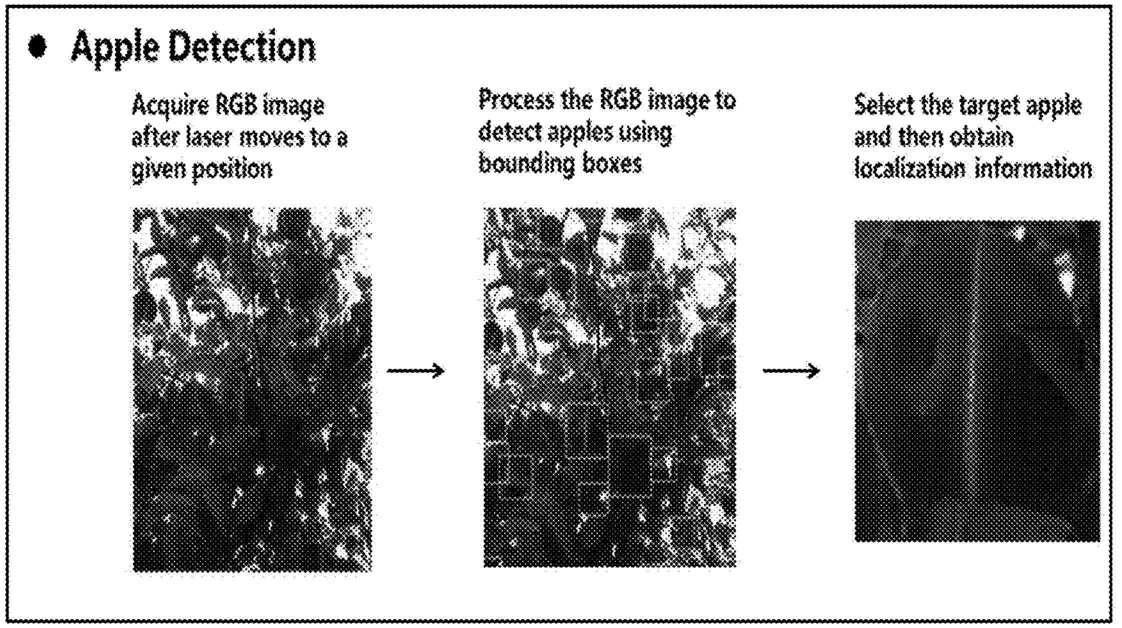

FIG. 5 is a flow chart showing the apple/fruit detection process.

Figure 6:
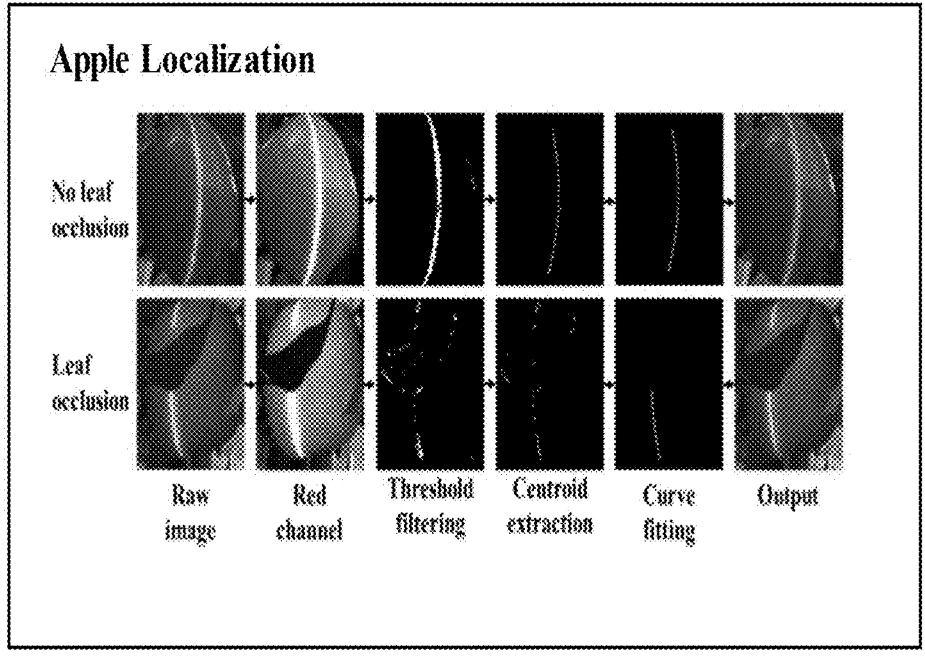

FIG. 6 is a flow chart showing the apple/fruit localization process using a line scan laser.

Figure 7:
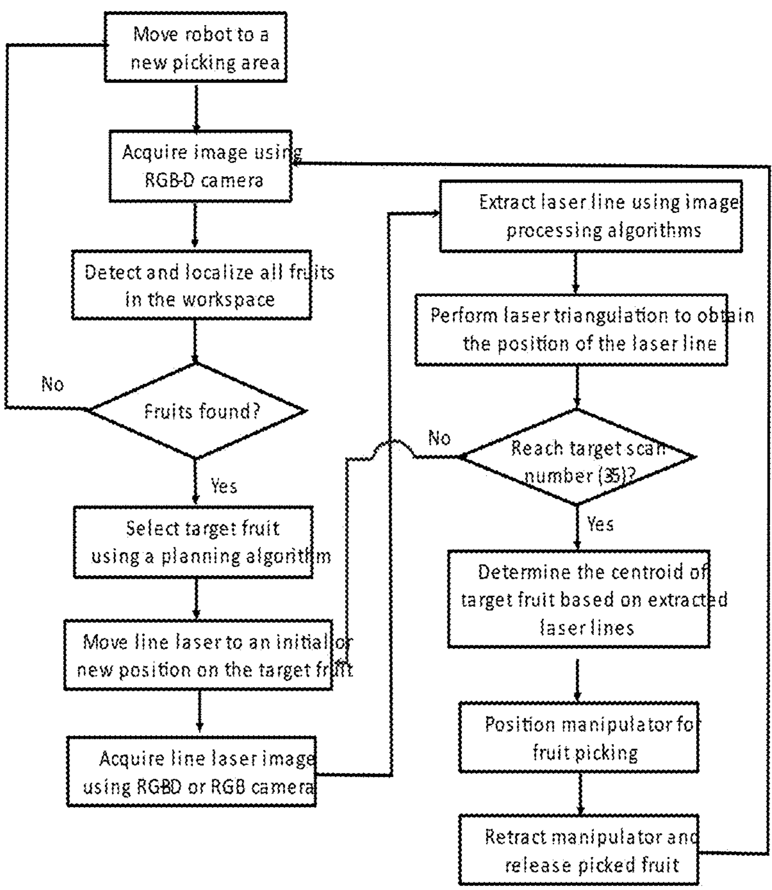

FIG. 7 is a more detailed flow chart showing both the fruit detection and localization processes.

Figure 8:
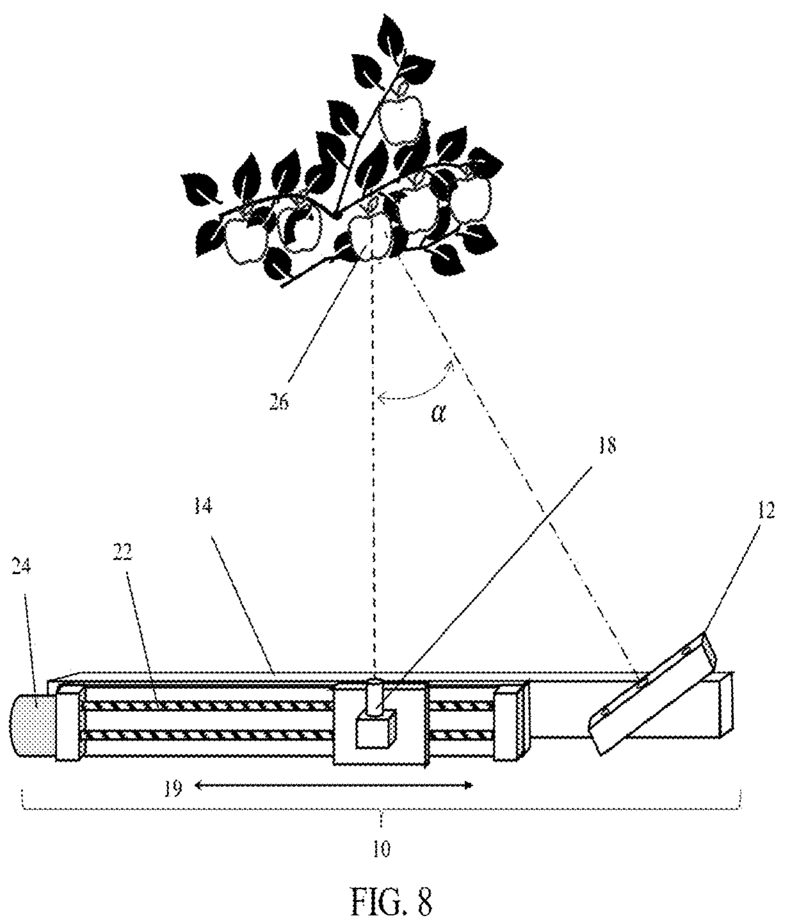

FIG. 8 is a schematic top view of a second preferred embodiment of the active laser-camera scanning system. In the second preferred embodiment, there is only one RGB-D camera and one line scan laser.

In accordance with the second preferred embodiment, a controller/processor first determines the initial fruit detection information for a target fruit based on images acquired by the RGB-D camera. The line scan laser then scans the target fruit. The RGB-D camera acquires RGB color images of the laser line as it paints the target fruit and communicates the images to the controller/processor. The controller/processor uses the images and a laser triangulation technique to localize the fruit and to determine the xyz position of the centroid of the target fruit.

Figure 9:
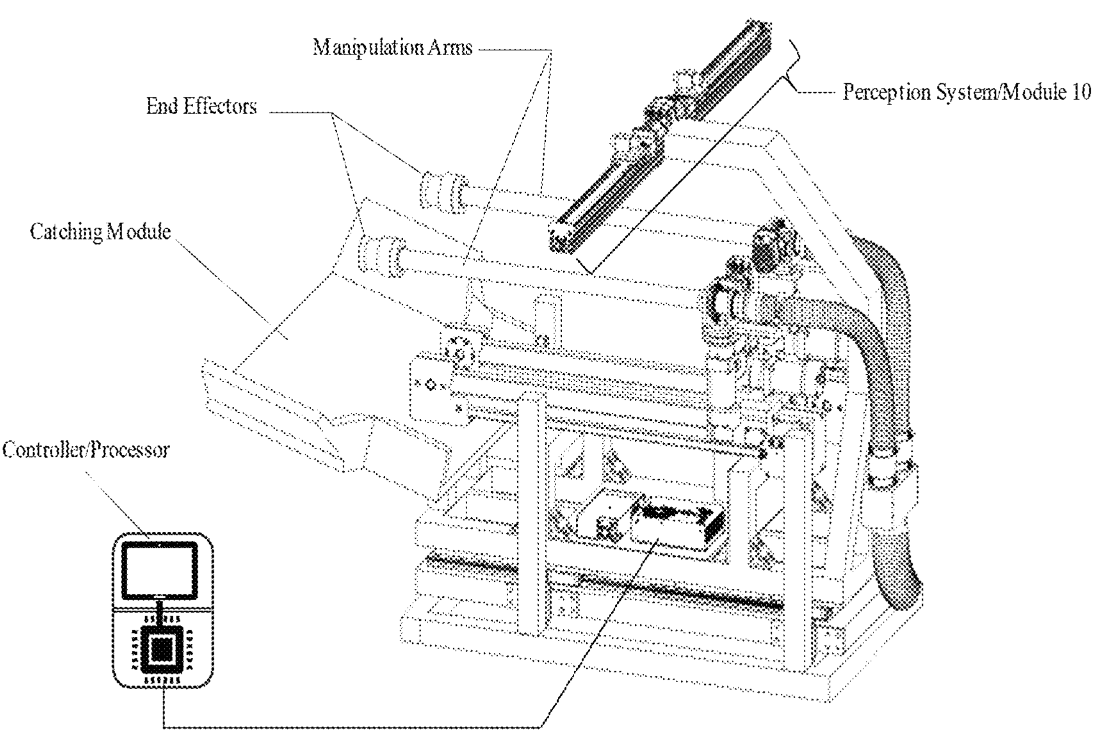

FIG. 9 is an elevated perspective view of the main components of the third preferred embodiment of the robotic apple harvesting system.

Figure 10:
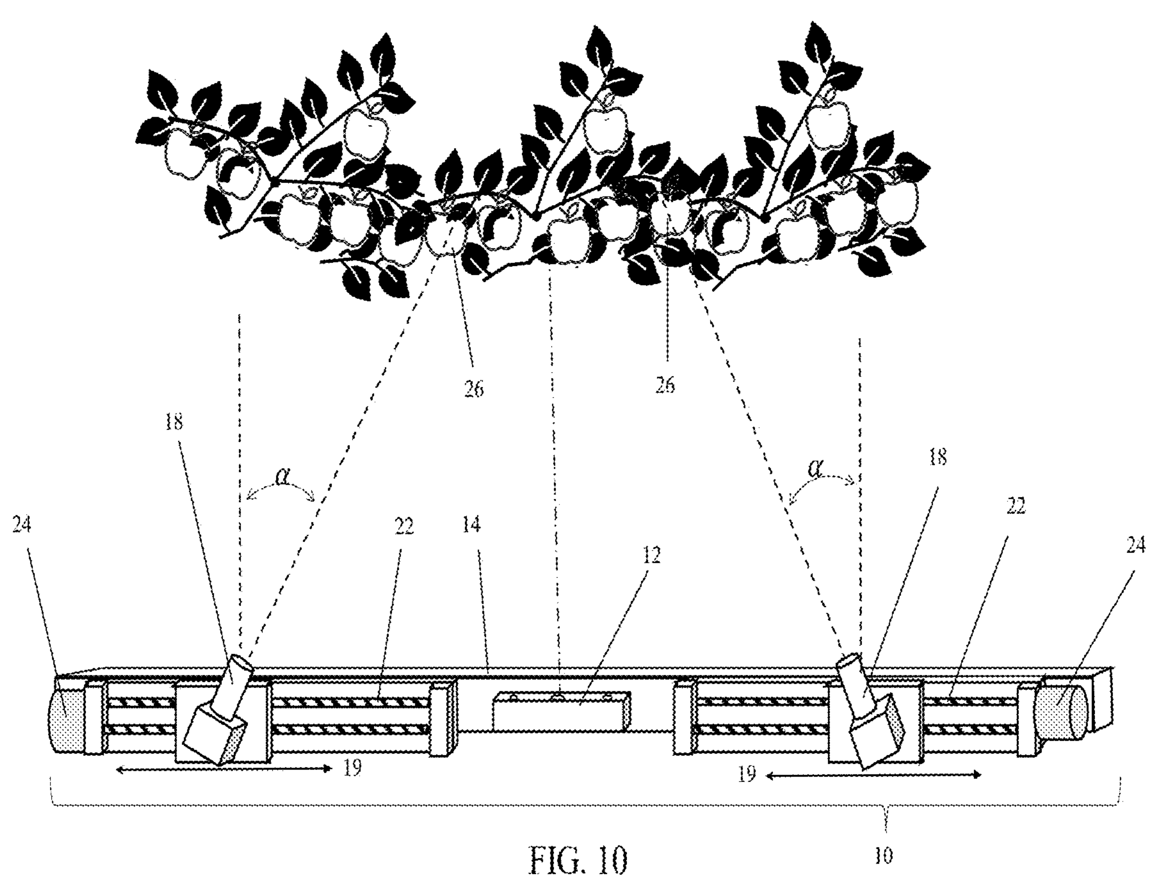

FIG. 10 is a top schematic view of a third preferred embodiment as shown in FIG. 9. The third preferred embodiment, two line scan lasers are arranged symmetrically with an angle of a with the RGB-D camera. In the third preferred embodiment, the perception system 10 provides localization and detection information for two robotic arms. The two line scan lasers are operated independently. The RGB-D camera first provides the initial localization information for two manipulation arms targeting two separate target fruits. The two line scan lasers then scan the target fruits either simultaneously or sequentially and the RGB-D camera acquires color images of the laser line as it paints the target fruit and communicates the images to the controller/processor. The controller/processor uses a laser triangulation technique to determine the xyz position of the centroid of each of the target fruits.

Note that assemblies/systems in some of the FIGS. may contain multiple examples of essentially the same component. For simplicity and clarity, only a small number of the example components may be identified with a reference number. Unless otherwise specified, other non-referenced components with essentially the same structure as the exemplary component should be considered to be identified by the same reference number as the exemplary component. Further, unless specifically indicated otherwise, drawing components may or may not be shown to scale.

DETAILED DESCRIPTION OF PREFERRED EMBODIMENTS

Figure 1:
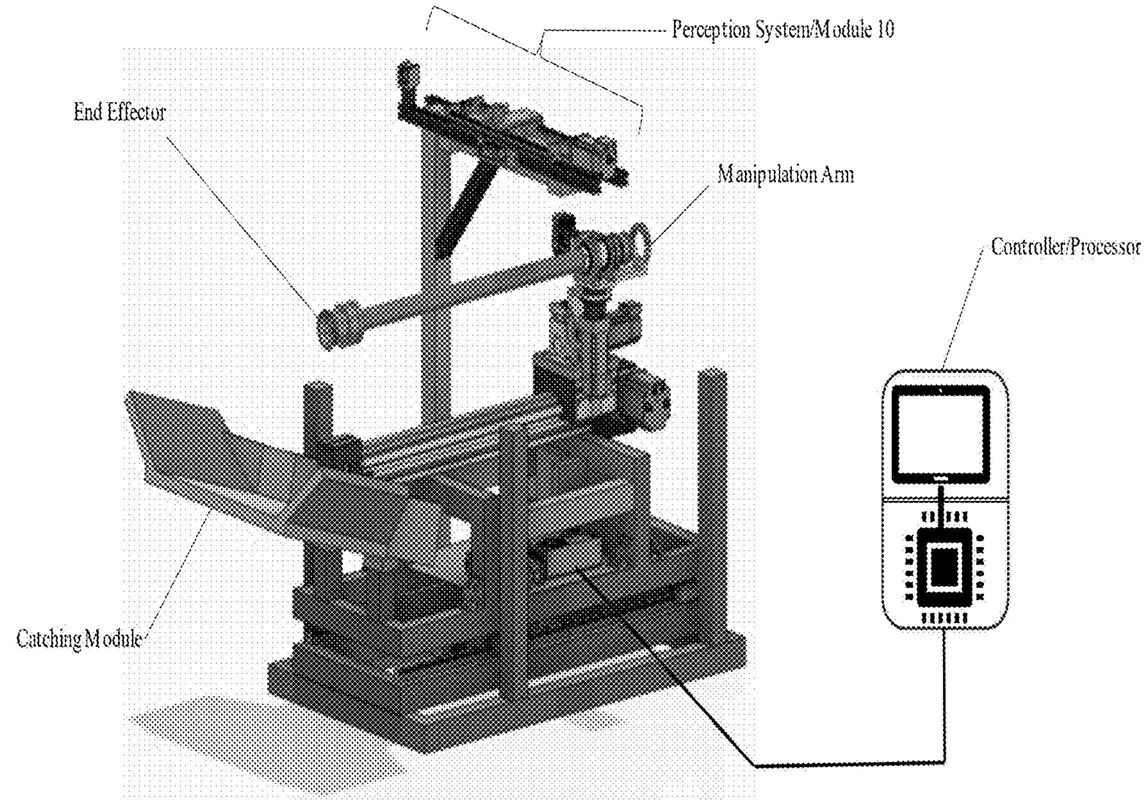
FIG. 1 is an elevated perspective view of the main components of a first preferred embodiment of the ALACS robotic apple harvesting system.

FIG. 1 shows one preferred embodiment of a robotic harvester. Specifically, FIG. 1 shows an alternative embodiment of the current inventors' robotic harvesting system as mentioned supra, and as disclosed in currently pending U.S. patent application Ser. No. 17/188,177, which has been incorporated by reference.

Overview

As shown in FIG. 1, the four main components of a robotic fruit harvester comprise: (1) a perception module/system; (2) an about 4 degrees-of-freedom manipulation arm (i.e. "manipulator"); (3) a soft vacuum-based end-effector; (4) a fruit catching module; and, (5) a controller/processor (or interchangeably, processor/controller). The robotic system is preferably mounted on a trailer base to facilitate movement in the orchard environment. An associated computer including at least a controller/processor, and communication interface is utilized to communicate and coordinate the movements of (at least) the robotic harvester's manipulation arm and the perception system. The system software is fully integrated using a robot operating system (ROS).

At the beginning of each harvesting cycle, the perception system is activated to detect and localize the fruits (preferably apples) within the robotic manipulation arm's workspace. Generally, a planning algorithm is used to generate a reference trajectory, and the controller/processor actuates the manipulation arm to follow the reference trajectory to approach the target fruit. After successfully attaching the fruit to the end effector, a rotation mechanism in the manipulation arm is triggered to rotate the end effector by a certain angle, and then the manipulator is directed to pull away from the tree and detach the target fruit. Finally, the manipulator retracts to a dropping spot and releases the fruit-which is caught by the fruit catching module. In the embodiments disclosed herein, the robotic harvester generates a vacuum force so that the end effector creates at least a partial vacuum seal with the target fruit to "pick" the target fruit. In further alternative embodiments, the end effector may be designed to contact and "pick" the targeted fruit through other means, such as a mechanically-based (non-vacuum) grasping or retention process.

Accordingly, the fruit detection and localization processes are the key/gateway tasks in the current automated robotic fruit harvesting process. The inventors' robotic systems utilize RGB-D cameras to facilitate fruit detection and localization. However, laboratory and field tests indicate that commercial RGB-D cameras alone do not provide sufficiently accurate depth information in the varying and unpredictable lighting of an orchard operating environment-which includes leaves, branches, and other occlusions. Inaccurate apple localization has been identified as one of the primary causes for fruit harvesting failure. To increase the accuracy and effectiveness of the fruit detection and localization processes, the inventors designed the Active LAser-Camera Scanner (ALACS) perception system, which seamlessly integrates a (preferably) red line laser with at least an RGB image for active sensing.

The ALACS system frequently incorporates/fuses an RGB-D camera to synergistically achieve fruit detection and localization. Specifically, the RGB-D fusion scheme includes at least two steps. In the first step, the images captured by the RGB-D camera are fed into a deep learning approach for fruit detection, and the target fruit location is then roughly calculated with the depth measurements provided by a controller/processor based on the image data acquired by the RGB-D camera. In the second step, by using the rough apple location, the line scan laser actively scans the target fruit, and a progressively more accurate fruit position is acquired.

ALACS System Design and the First Preferred Embodiment

FIGS. 2 and 3 show a first preferred embodiment of the ALACS perception system/module 10, which includes RGB 20 and RGB-D 12 cameras. FIG. 3 essentially shows a top view of FIG. 2. As shown in FIGS. 2-3, the perception module 10 of the robotic fruit harvesting system includes an RGB-D camera (e.g., Intel RealSense D435i RGB-D camera 12, Intel Corp., Santa Clara, CA, USA) as a component of the ALACS perception module 10. The RGB-D camera 12 is mounted on a horizontal frame 14. The RGB-D camera is positioned above the manipulation arm (per FIG. 1) to provide an elevated perspective view of the manipulation arm's working area. The ALACS perception system 10 further comprises a red line laser 18, an RGB camera 20, and a linear motion slide 22 driven by a (preferably) electrically controllable motor 24.

An active line laser 18 is mounted on the linear motion slide 22 so that the active line laser 18 selectively slides horizontally (as directed by the controller/processor perception system software) along a horizontal plane as indicated by the bidirectional line 19. The slide 22 may be moved mechanically through control of the motor 24, or through a horizontal motion drive at the base of the line scan laser 18, or by any means known in the art. In the current preferred embodiment, the line laser has about a 20 cm horizontal range of movement. As best shown in FIG. 3, the RGB camera 20 is installed adjacent to the linear motion slide 22 with a relative angle $\alpha$ to the line laser 18. As further shown in FIG. 2, the targeted fruit is preferably an apple 26.

The hardware configuration of ALACS facilitates depth measurements by using the principle of laser triangulation. Laser triangulation techniques conventionally capture depth measurements using a laser illumination source in combination with a camera for precision 3D object profiling.

Significantly, the ALACS perception system 10 described herein is different from conventional laser triangulation sensors. For conventional laser triangulation sensors, the relative position between the laser and the camera is fixed (i.e., both camera and laser are either stationary or moving simultaneously). For the current ALACS system, the position of the RGB 20 (and RGB-D 12) camera(s) are fixed—while the position of the line laser 18 is continuously adjusted and selectively repositioned along the linear motion slide 22 by the ALACS perception system software.

The RGB-D camera 12 and the other components of the ALACS system are fused synergistically to achieve fruit detection and localization. Specifically, the fusion scheme includes two steps. In the first step, the images captured by the RGB-D camera 12 are fed into a deep learning model for fruit detection, and the target fruit location is then roughly calculated (via the controller/processor) with the depth measurements provided by the RGB-D camera 12, as shown in FIGS. 2-3. In the second step, by using the rough fruit location, the line scan laser 18 actively scans the target fruit 26, and an ameliorative fruit position is obtained. As shown in FIG. 4, the basic working principle of ALACS is to project the laser line onto the target fruit 26 and then use image information and triangulation technique to localize the fruit 26.

With reference to FIGS. 5-7, the perception strategy/process of the ALACS perception system is designed as follows:

1. Initialization/Detection. As a robotic harvesting system is moved into a new picking area, rough positions of potentially targeted candidate fruits are acquired by processing RGB-D 12 image data. The acquired RGB-D image data is first processed using a specially developed deep learning algorithm to identify all fruits 26 in the workspace, using "bounding boxes", as described in the fruit detection flow chart FIG. 5 and in FIG. 7. The rough localization information for all detected fruits 26 in the robot's working space is subsequently obtained by fusing the bounding boxes with the point cloud data (depth image) provided by the RGB-D camera 12. The first target fruit 26 to be picked by the robot's manipulator arm is then determined using a planning algorithm based on a specific optimization scheme. Thereafter, the rough position information for the target fruit 26 is used to actuate or move the linear motion slide 22 to direct the line laser 18 towards an initial position, ensuring that the red laser line is projected on the left half region of the target fruit 26 as shown in FIG. 4.
2. Interval scanning. When the laser reaches the initial position, the RGB camera 20 is activated to capture an RGB image as the line scan laser line "paints" the surface of the target fruit 26. For the purposes of this disclosure, the term "paints" means that the line scan laser line traces/illuminates the (generally convex) shape/surface of the target fruit so that the exact shape of the target fruit is visible in the RGB image data acquired by the RGB camera (or RGB-D camera in the second and third preferred embodiments)—as best shown in FIG. 4.

The linear motion slide 22 then travels to the right by about four cm in 1-cm increments, pausing at each increment to allow the RGB camera 20 to take an image. A total of about three to five images are acquired through this scanning procedure, with the laser line projected on various positions in each image. The purpose of the scanning strategy is to mitigate the impact of occlusion-since the laser line provides high spatial-resolution localization information for the target fruit 26. More precisely, when the target fruit 26 is partially occluded by foliage, moving the laser to multiple positions can reduce the likelihood that the laser lines will be entirely blocked by the obstacle.

3. Localization/Refinement of 3D position. As generally shown in FIGS. 5-6, and described in FIG. 7, for each image captured by the RGB 20 or RGB-D 12 cameras, the laser line projected on the target fruit surface 26 is extracted following multiple image processing steps and then used to generate a 3D location candidate. Computer vision approaches and laser triangulation-based techniques are exploited to accomplish laser line extraction and position candidate computation, respectively. Three to five position fruit candidates will be generated as a result, and a holistic evaluation function is used to select one of the candidate fruits as the (final) designated targeted fruit 26.

Essentially, the robot's planning algorithm then determines which fruit to pick first. This information is used to guide the line laser to scan the target fruit for multiple scans (3 to 5) at a predetermined distance increment. For red-color fruit, a red laser of approximately 635 nm is preferred. Out of the three channels of images (i.e., R, G, and B); the red channel image was found more effective for extracting the laser lines from the target fruit. As further shown in FIG. 6, using an image filtering technique, the laser lines or line segments on the target fruit are obtained, and the centroid of the target fruit is determined using a curve fitting method. The controller/processor (via the perception system software) then moves the manipulation arm into position and the end effector grips the target fruit.

Second Preferred Embodiment

FIG. 8 discloses a second preferred embodiment of the robotic harvester perception system 10. The second preferred embodiment comprises an RGB-D camera 12 with FLIR (or forward looking infrared) capability, and one active line scan laser 18. In the second preferred embodiment, the RGB-D camera 12 performs the tasks of both the RGB 20 and the RGB-D 12 cameras described in the first preferred embodiment. Specifically, the RGB-D camera first determines the initial fruit detection information for a target fruit 26, and then acquires RGB image data as the line scan laser paints the target fruit.

In accordance with the second embodiment, a controller/processor first determines the initial fruit detection information for a target fruit based on images acquired by the RGB-D camera 12. The line scan laser then scans the target fruit. The RGB-D camera acquires color RGB images of the laser line as it paints the target fruit and communicates the images to the controller/processor. The controller/processor uses the images and a laser triangulation technique to localize the fruit and to determine the xyz position of the centroid of the target fruit. As with the first preferred embodiment, the detection and localization processes are shown and described in greater detail in FIGS. 5-7. The second embodiment is the most preferred of the three preferred embodiments.

Third Preferred Embodiment

FIGS. 9 and 10 disclose a third preferred embodiment of the robotic harvester perception system 10. The third preferred embodiment is configured so that the perception system 10 provides fruit detection and localization information for two separate robotic manipulation arms. As shown in FIGS. 9 and 10, two line scan lasers 18 are arranged symmetrically with an angle of a relative to an RGB-D camera 12. The two line scan lasers 18 operate independently. The RGB-D 12 camera first provides the initial detection information for two target fruits 26. The two line scan lasers 18 then scan the target fruits 26 either simultaneously or sequentially. The RGB-D camera acquires RGB image localization data as the line scan laser paints the target fruit—and communicates the data to the controller/processor. The controller/processor processes the image data using the same laser triangulation technique previously described to determine the xyz position of the centroids—as described in FIGS. 5-7 and as discussed supra.

For the foregoing reasons, it is clear that the subject matter described herein provides an innovative perception system for a robotic fruit harvester. The current system may be modified in multiple ways and applied in various technological applications. For example, although the target fruit is preferably an apple, in alternative embodiments the targeted fruit may be a pear, mango, orange, lemon, lime, and the like, to the extent that an end effector can form a vacuum seal with the targeted fruit. The disclosed method and apparatus may be modified and customized as required by a specific operation or application, and the individual components may be modified and defined, as required, to achieve the desired result.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed in this specification are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the implied term "about." The (stated or implied) term "about" indicates that a numerically quantifiable measurement is assumed to vary by as much as 30 percent, but preferably by at least 10%. Essentially, as used herein, the term "about" refers to a quantity, level, value, or amount that varies by as much 10% to a reference quantity, level, value, or amount. Accordingly, unless otherwise indicated, the numerical properties set forth in the following specification and claims are approximations that may vary depending on the desired properties sought to be obtained in embodiments of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein. The term "an effective amount" as applied to a component or a function excludes trace amounts of the component, or the presence of a component or a function in a form or a way that one of ordinary skill would consider not to have a material effect on an associated product or process.

What is claimed is:

1. A robotic harvester having a fruit perception system comprising:

a slide mechanism;

a line scan laser that is selectively movable by the slide mechanism;

an RGB-D camera, the line scan laser projecting a laser line within a field of view of the RGB-D camera;

a controller/processor in communication with the slide mechanism, the line scan laser, and the RGB-D camera, the controller/processor directing operations and movements of the line scan laser, and processing images from the RGB-D camera;

wherein as the slide mechanism moves the line scan laser, the line scan laser projects a laser line onto a target fruit from multiple sequential positions, the RGB-D camera acquires images of the laser line projected onto the target fruit, and communicates the laser line images to the controller/processor, the controller/processor processing the laser line images and determining an xyz position of the centroid of the target fruit.

2. The perception system of claim 1 wherein the perception system is in electrical communication with a manipulator arm through the controller/processor, the controller/processor directing the manipulator arm to the target fruit.

3. The perception system of claim 2 wherein the manipulator arm further comprises an end effector which makes at least a partial vacuum seal.

4. The perception system of claim 3 wherein the RGB-D camera is positioned and structured to acquire detection and localization data to direct the manipulator arm and associated end effector to the centroid of the target fruit and thereby pick the target fruit.

5. The perception system of claim 2 wherein the perception system is positioned above the manipulator arm.

6. The perception system of claim 1 wherein the slide mechanism selectively moves the line scan laser horizontally by means of an electrically controllable motor that is in communication with the controller/processor, while the RGB-D camera remains stationary, and wherein the controller/processor is configured to (i) move the line scan laser to a first position to paint a region of the target fruit and then move in increments of a predetermined distance interval to multiple sequential positions to paint additional regions of the target fruit while the RGB-D camera acquires a RGB image at each position, (ii) extract the laser line on the target fruit from the RGB image at each position, and (iii) perform laser triangulation to determine the xyz position of the centroid of the target fruit based on the extracted laser lines.

7. The perception system of claim 1 wherein the perception system is structured so that the RGB-D camera is positioned adjacent to the line scan laser and the slide mechanism.

8. The perception system of claim 1 further comprising an RGB camera, the perception system being structured so that the RGB-D camera acquires fruit detection data, while the RGB camera acquires fruit localization data, both the RGB and the RGB-D cameras being in communication with the controller/processor.

9. The perception system of claim 1 wherein the perception system comprises an additional line scan laser so that the perception system comprises two separate line scan lasers, each of the line scan lasers being connected to a corresponding separate slide mechanism so that each line scan laser moves independently from the other line scan laser.

10. The perception system of claim 9 wherein the system is structured so that the RGB-D camera communicates image data from both line scan lasers to the controller/processor-which communicates the data to two separate manipulator arms.

11. The perception system of claim 9 wherein the perception system is structured so that the RGB-D camera is positioned between the two line scan lasers.

12. A method of robotically picking a target fruit, the method comprising:

(a) providing the perception system of claim 1;

(b) directing the RGB-D camera to detect candidate target fruits and acquire rough images identifying the candidate target fruits and defining the candidate target fruits by bounding boxes;

(c) using a planning algorithm to select the target fruit from the candidate fruits in the bounding boxes;

(d) actuating the slide mechanism to direct the line scan laser to an initial position to paint the target fruit with a laser line;

(e) utilizing the RGB-D camera to obtain an RGB image of the line scan laser line as it paints a surface of the target fruit, and communicating the line scan laser image data to the controller/processor;

(f) utilizing image processing algorithms to extract the laser line on the target fruit from the red-channel of the RGB image;

(g) utilizing a laser triangulation technique to determine the xyz position of the extracted laser line;

(h) moving the line scan laser to a next position and painting the target fruit surface with a laser line, the RGB-D camera communicating extracted line scan laser image data to the controller/processor;

(i) repeating steps (f) and (g) until sufficient line scan laser image data is acquired for the controller/processor to calculate the xyz positions of all laser lines;

(j) determining the xyz position of the centroid of the target fruit by selecting one of the laser lines based on a holistic evaluation function.

13. The method of claim 12 wherein, in step (b), a deep learning algorithm is used to detect all fruits in the workspace and define the bounding boxes.

14. The method of claim 12 wherein, in step (c), image depth point cloud data and bounding boxes are used in combination with the planning algorithm to identify the target fruit.

15. The method of claim 12 wherein, in step (d), the line scan laser paints a left half region of the target fruit with a red laser line.

16. The method of claim 12 wherein, in step (h), the line scan laser moves horizontally.

17. The method of claim 16 wherein the line scan laser moves to a first position, and then moves to about four sequential positions, the RGB-D camera extracting line scan laser image data at each position.

18. The method of claim 17 wherein the line scan laser moves in about 1 cm increments.

19. The method of claim 12 wherein, in step (a), the perception system includes an additional RGB camera.

20. The method of claim 19 wherein, in steps (e) and (h) utilizing the RGB camera (rather than the RGB-D camera) extracts line scan laser image data from the line scan laser line as the laser line paints the surface of the target fruit.

* * * * *